F. A. EUSTIS, C. R. HAYWARD, H. M. SCHLEICHER, AND D. BELCHER.
ART OF MAKING ELECTROLYTIC IRON.
APPLICATION FILED DEC. 1, 1920.
1,412,174.
Patented Apr. 11, 1922.
2 SHEETS—SHEET 1.
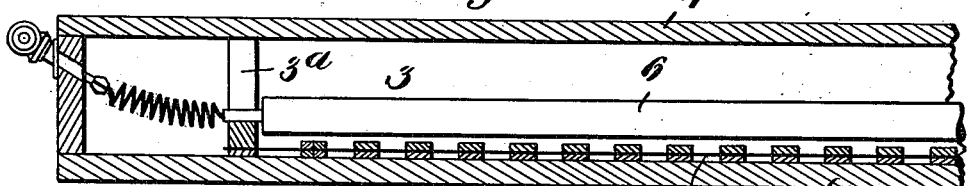
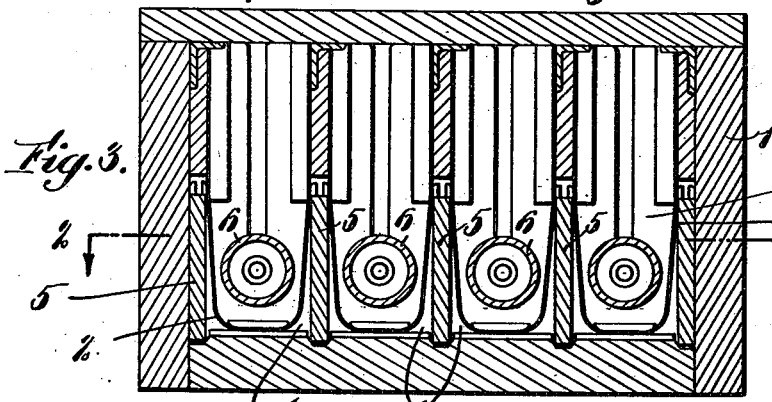
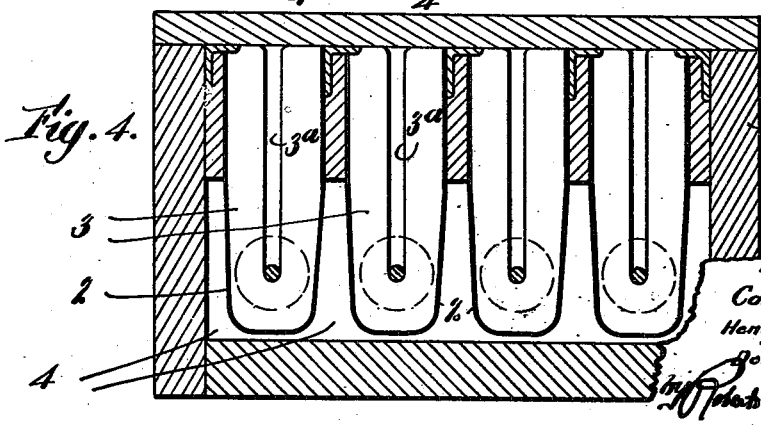
Inventors:
Frederic A. Eustis
Carle R. Hayward
Henry M. Schleicher
Donald Belcher

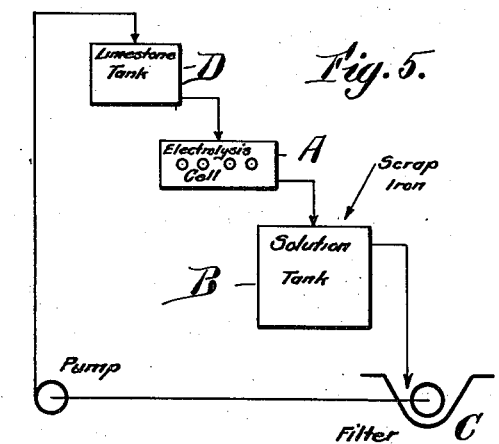
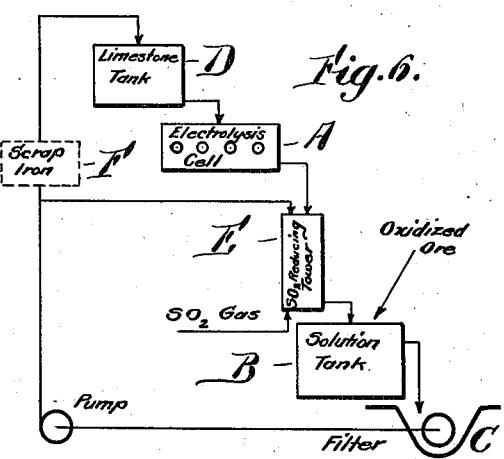
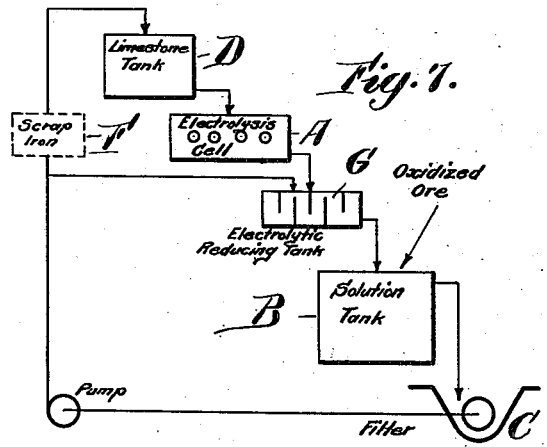
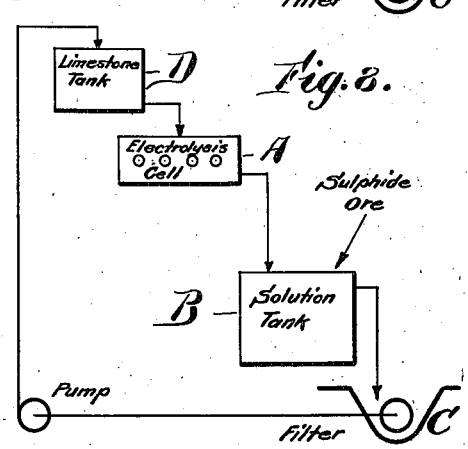
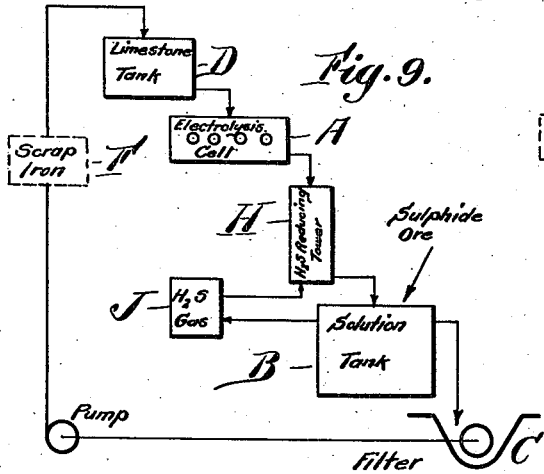
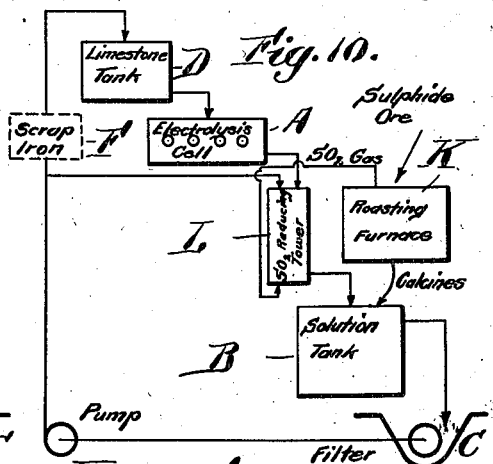

UNITED STATES PATENT OFFICE.

FREDERIC A. EUSTIS, OF MILTON, CARLE R. HAYWARD, OF QUINCY, AND HENRY M. SCHLEICHER AND DONALD BELCHER, OF BOSTON, MASSACHUSETTS, ASSIGNORS, BY DIRECT AND MESNE ASSIGNMENTS, OF ONE-HALF TO SAID EUSTIS AND ONE-HALF TO CHARLES PAGE PERIN, OF NEW YORK, N. Y.

ART OF MAKING ELECTROLYTIC IRON.

1,412,174.      Specification of Letters Patent.      Patented Apr. 11, 1922.

Application filed December 1, 1920. Serial No. 427,541.

*To all whom it may concern:*

Be it known that we, FREDERIC A. EUSTIS, of Milton, in the county of Norfolk, CARLE R. HAYWARD, of Quincy, in said county of Norfolk, HENRY M. SCHLEICHER and DONALD BELCHER, both of Boston, in the county of Suffolk, all in the Commonwealth of Massachusetts, citizens of the United States of America, and residents, respectively, of the places above mentioned, have invented new and useful Improvements in the Art of Making Electrolytic Iron, of which the following is a specification.

This invention relates to the manufacture of electrolytic iron from solutions, and the preparation of the ferrous solutions suitable for the electrotytic deposit of iron.

The ferrous solution from which iron is deposited by electrolysis is preferably a solution of ferrous chloride in water, but it is to be understood that the processes may be carried out using solutions containing other salts of iron, such for instance as ferrous sulphate solution, or indeed any salts of iron that will in solution dissociate to deposit iron under the action of electrolysis, that will form the two series of salts, ferric and ferrous, and that will attack the ore or other raw material constituting the source of iron. By way of illustration therefore, and not of limitation, we will describe the processes using a ferrous chloride solution.

The ferrous solution when made by any of the methods hereinafter described will contain at least some acid or ferric salts, such as ferric chloride, although it may be only traces, and must be thoroughly neutralized before it is suitable for the production of electrolytic iron, because the presence of acid or ferric salts causes a poor iron deposit and results in low current efficiency. To this end the solution is mixed with pulverized limestone in a suitable tank. Limestone furnishes calcium carbonate ($CaCO_3$) which is the most suitable agent for neutralization, as it has the capacity of readily precipitating first ferric salts before precipitating the ferrous salts. We have found that for the best results it is advisable to use enough neutralizing agent to precipitate a small amount of ferrous iron. This insures complete neutralization of the liquor, the neutrality of the solution in the cathode compartment of the electrolytic cell being an indispensable condition for the most efficient electrolysis of iron. It will, of course, be understood that if the ferrous solution is already sufficiently neutral to give satisfactory results in the step of depositing iron by electrolysis in the electrolytic cell, this neutralization step may be omitted.

The solution is then filtered if necessary, heated nearly to the boiling point, and passed hot into the cathode compartment of a diaphragm electrolytic cell. Under proper conditions metallic iron is deposited on the cathode. The liquor passes through the diaphragm into the anode compartment and is thence returned to the process to be used in making more ferrous solution as hereinafter described.

A special electrolytic cell is used illustrated in the accompanying drawings, in which,—

Figure 1 is a longitudinal vertical section;

Figure 2 is a longitudinal horizontal section on the plane of line 2—2 of Fig. 3;

Figure 3 is a vertical cross section, on an enlarged scale on line 3—3 of Fig. 2; and Figure 4 is a vertical cross section, on an enlarged scale, on the line 4—4 of Fig. 2.

Figs. 5 to 10 inclusive, diagrammatically illustrate the various cycles of operations employed in this process.

1 represents the casing of the cell containing one or more diaphragms 2, dividing the cell into cathode compartments 3 which communicate one with another through the slots 3ª and anode compartments 4 which communicate one with another between the slightly spaced anodes 5. The anodes are of carbon and are stationary. 6, 6, represent rotating cathodes in the form of rods or mandrels of iron, brass, or other suitable material, journaled in slots 3ª, and removable from the cell. The cathodes are caused to rotate by any suitable driving means at a surface speed of the order of 300 or 400 feet per minute.

The diaphragm 2 is of asbestos cloth or other suitable material which is not only permeable to the electrolyzed ions, but is also permeable enough to permit the flow of the solution through it. The diaphragm is so arranged that the rate and direction of flow of liquor can be controlled. For highest current efficiency the flow of liquor from the anode compartment must be avoided. This can be accomplished by maintaining the level of the liquor in the cathode compartment above the level in the anode compartment, thus insuring the flow of the liquor away from the cathode into the anode compartment.

The diaphragm thus can be made to act as a dam, maintaining this difference in level and causing the liquor to flow in the direction stated, thus opposing the passage of the liquor from the anode compartment to the cathode compartment and so keeping any ferric iron in the anode liquor away from the cathode. A suitable overflow passage should be provided from the cathode compartment to the anode compartment to limit the height of the liquor in the cathode compartment to a predetermined level in case the density of the diaphragm is such as to prevent the passage of all the liquor therethrough. Ferric chloride in solution is produced in the anode compartment and if allowed to pass into the cathode compartment would tend to redissolve the iron which has been deposited on the cathode, and would also render the deposit physically unsatisfactory and result in poor current efficiency. The mode of operation described gives very high current efficiency and makes it possible to use current density from 50 to 100 amperes per square foot of cathode area, permitting the use of relatively small apparatus.

Upon the passage of the electric current, metallic iron is deposited from the solution upon the rotating cathode in the form of a tube, and the chlorine ions migrate toward the anode passing through the diaphragm.

A small amount of ferric salts present in the liquor as a result of the cycle of operations presently to be described will have been precipitated by the limestone in the step of neutralizing the solution. Such precipitated ferric salts coming into the cathode compartment with the neutralized solution act as a depolarizer for hydrogen and do not attack the cathode deposit as would unprecipitated ferric salts. If the ferric salts fail to remove all the hydrogen at the cathode, the quantity of ferric salts may be increased; or it may be advisable to provide means for physically rubbing off the bubbles of hydrogen from the iron tube deposited on the cathode to insure a smooth deposit. This may be done by means of a brush of asbestos, rubber or other suitable material, or with a mass of insoluble material such as finely divided coal in the solution in which the cathode rotates.

Important conditions to be observed in the electrolysis are that the solution in the cathode compartment should be strictly neutral and maintained so; and that the temperature of the solution should be high and maintained substantially constant, preferably around 95° C. If the continuous flow of hot solution to the electrolytic cell is not adequate to maintain the substantially constant high temperature, provision should be made for heating the solution in the cell itself.

To take the iron deposit off the cathode the latter is removed from the cell. If the iron is deposited directly on a mandrel of iron or brass for example, constituting the cathode, it is difficult to get the iron tube off the mandrel. It is possible to do this by annealing the iron tube with the mandrel inside, and rolling it, but this is a troublesome operation and necessitates passing the mandrel through the annealing furnace. To facilitate the removal of the tubular deposit of iron we prefer to coat the mandrel with a layer of lead or other suitable easily fusible material which will conduct electric current. The iron is then deposited on the fusible coating. The fusible coating is quickly melted when heated in the annealing furnace, and the mandrel withdrawn. Any lead or similar coating material which gets into the furnace runs to the bottom and may be used again. Obviously the heating and fusing of the coating to loosen the iron deposit could be done otherwise, but as the iron deposit is usually to be annealed in any event it is convenient to use the heat of the annealing furnace to fuse the coating. While the method described of coating the cathode with a fusible material is believed to provide the best means of loosening the iron deposit from the cathode, conceivably the coating could be supported on a mandrel or core of non-conductive material, in which case the coating would itself constitute the electrode; or the mandrel might be made wholly of fusible material capable of carrying the electric current; the essential condition being that the current carrying cathode should have a surface of fusible material which can be melted or softened by heat to loosen the iron deposit from it. There are several ways of making the ferrous solution from which the iron is deposited in the manner hereinbefore described. By way of illustration we will describe methods of making the ferrous solution from three different sources of iron, namely, scrap iron, oxidized ores, and sulphide ores. Each process is cyclic and includes in its cycle the steps already described of neutralizing and electrolyzing the ferrous solution.

The diagrams shown in Figs. 5 to 10 inclusive of the accompanying drawings illustrate various cycles of operations adapted to the use of the different raw materials; Fig. 5 showing a cycle for the treatment of scrap iron alone, Figs. 6 and 7 showing cycles adapted to the use of oxidized ores, or oxidized ores combined with scrap iron, and Figs. 8, 9 and 10 showing cycles adapted to the use of sulphide ores, or sulphide ores combined with scrap iron. In each case the electrolytic cell A is preferably of the kind shown in Figs. 1 to 4 of the drawings, and already describ :

*Scrap iron.*—When scrap iron is the raw material used, the anode liquor containing ferric chloride and ferrous chloride (or ferric and ferrous sulphates if the original solution was a sulphate instead of a chloride) is discharged from the electrolytic cell or tank A and then put directly on the scrap iron in a suitable dissolving or solution tank B. The ferric chloride will dissolve the iron and will itself be reduced to ferrous chloride. The ferrous solution, which may be still slightly acid, is then filtered at C and pumped to the limestone tank D where the neutralization of the solution is completed. The solution is then heated and delivered hot to the electrolytic cell A for the deposit of iron, and the cycle repeated. The actions which take place in the limestone treatment in tank D, and in the electrolytic treatment in tank A, have already been fully described.

*Oxidized ore.*—If oxidized ores of iron, such as limonite, hematite or magnetite, are used, the anode liquor containing ferric chloride and ferrous chloride, should first be reduced to a ferrous solution. This may be accomplished by treating the liquor with sulphur dioxide ($SO_2$) gas before the liquor is put on the ore. The procedure would be as illustrated in the diagram of Fig. 6. The hot anode liquor is discharged from the anode compartment of electrolytic cell A into the top of a reducing tower E packed with coke. A gas containing sulphur dioxide ($SO_2$) is introduced at the bottom of the tower and rising through the tower comes into contact with the descending solution. This reduces the ferric chloride to ferrous chloride, and the resulting liquor discharged from the reducing tower contains a large amount of ferrous chloride, a small amount of sulphuric acid and a small amount of hydrochloric acid. This constitutes a leach liquor by which the iron may be dissolved from the ore. The reduced leach liquor is then put on the ore in a solution tank B where it dissolves iron from the ore, and is then filtered at C. Thence the major part of the solution is pumped back to the top of the reducing tower, while the smaller part will be advanced to limestone tower D for neutralizing and thereafter electrolyzing at A as before. The part which is sent to the limestone tower may optionally be passed through scrap iron in a tank F for the purpose of further enriching the solution in iron and at the same time using up part of the acid coming from the solution tank B.

As an alternative method of reducing the anode liquor, it may be delivered from the main electrolysis tank A in which the iron is deposited, into a second electrolytic cell G (see Fig. 7) which may be termed an electrolytic reducing cell. The application of electric energy to the ferric solution in the electrolytic reducing cell G will reduce the solution from the ferric to ferrous state. This reduction of the ferric salts formed in the electrolysis cell A furnish acid needed for dissolving the oxidized ore. In other respects the procedure may be the same as indicated in Fig. 6.

The reason for returning the greater part of the liquor from the ore solution tank to the reducing tower or the reducing cell as the case may be, is that the effect of the action of the leach liquor on most oxidized ores is to take iron into solution in ferric state; therefore, the solution coming from the ore solution tank will contain ferric salts and must again be reduced.

If all the liquor were sent direct to the limestone neutralizing tank it would be necessary to use large amounts of limestone for neutralization because of the large amount of ferric chloride present in the solution dissolved from the ore. This is not only costly in limestone but may use up too much acid in the neutralization step. Therefore, a part of the solution is sent from the ore solution tank back to the reducing cell where the ferric chloride dissolved from the ore is reduced, and the solution so reduced upon again passing over the ore picks up more ferric iron but only one third as much as was present immediately before it was reduced. Thus by repeatedly cycling part of the solution through the reducing tower and over the ore the ferric iron in that part of the solution advanced to the limestone tank may be diminished to any point desired.

Since sulphur dioxide is not used for reduction in the procedure indicated in Fig. 7, but merely electrical energy, there is no source of new acid in the cyclic process itself and the acid must therefore be carefully conserved. This can be done by turning a large portion of the solution from the ore solution tank back to the reducing cell and advancing only a small portion to the limestone tank for neutralizing. Even with this mode there is some loss of acid which can economically be restored by blowing $SO_2$ gas into the liquor in the reducing cell or at some other convenient point.

When the reduction of the anode liquor is performed by an electrolytic reducing cell, oxygen comes off at the anode of the reducing cell during the electrolysis if a sulphate electrolyte is used, and may be recovered as a by-product. When a chloride electrolyte is used chlorine gas is given off and for this reason the electrolytic method of reduction is less desirable for chloride solutions than for sulphate solutions.

The ore to be treated in the solution tank B should be finely ground or pulverized to insure an efficient and speedy action of the solvent. Many oxide ores occur in nature in fine condition and such will require only a final pulverizing treatment. The mixture in the solution tank should be maintained at a high temperature, as the hotter the mixture the more effective is the action. Good results may be obtained at a temperature of 70° C. and above. It is also desirable to stir or agitate the mixture in order to insure constant contact of active solvent with the ore; or percolation may be used. A counter-current method of leaching is advised, by which fresh ore is treated with the weakest solution and the residue of the ore is treated with fresh solution.

*Sulphide ores.*—When sulphide ores, such as pyrite, pyrrhotite or marcasite, are used as raw material, we have found that with certain of the ores the anode liquor may be used as it is discharged from the electrolytic cell to dissolve iron from the ore. The diagram of Fig. 8 illustrates this method. The anode liquor, coming from the electrolytic cell A, is put directly on the finely divided sulphide ore in a solution tank B. The ferric chloride in the solution will dissolve iron from the ore and in so doing will also reduce the solution to the ferrous state, with a precipitation of sulphur which is a valuable by-product. The reduced liquor from the solution tank is then filtered at C and sent back to the limestone tank D and electrolytic cell A, for neutralizing the solution and depositing iron as before.

This method is highly advantageous, on account of its simplicity and cheapness, whenever the sulphide ore is of a character to yield readily to the reactions. Pyrrhotite for instance is well adapted to this method.

If, however, a sulphide ore is used of such character that solution of the iron and reduction will not take place readily in one apparatus, it may be advantageous to reduce the anode liquor in a separate step after it is discharged from the electrolytic cell A.

Therefore as an alternative method of dealing with sulphide ore, illustrated in the diagram of Fig. 9, the anode liquor discharged from the electrolytic cell A may be put into the top of a reducing tower H, and hydrogen sulphide ($H_2S$) gas introduced at the bottom. Under these conditions the solution will be reduced to the ferrous state, acid will be formed, and sulphur precipitated. The latter may be recovered as a by-product. The acid liquor emerging from the tower H is then put on the sulphide ore in solution tank B and dissolves iron from the ore. At the same time the solution acting on the sulphide ore generates the hydrogen sulphide gas which is needed in the reducing tower H. This hydrogen sulphide gas may be led from tank B into a storage chamber J and thence delivered to the bottom of tower H. The solution from the ore solution tank B is then filtered and sent to the limestone tank D and electrolytic cell A for neutralizing the solution and depositing iron, as before, and the cycle is completed. If desired the liquor may be passed through scrap iron in a tank F before it is put into the limestone tank, to enrich the solution in iron and use up some of the acid which the sulphide ore has been unable to neutralize. Such acid may be made in the cycle by unavoidable oxidation of some portion of the sulphur.

A still further modification of the treatment of sulphide ores is illustrated in the diagram of Fig. 10. This method includes roasting the ore in a suitable roasting furnace K. The roasting generates $SO_2$ gas which is sent to the bottom of reducing tower L in which it is used instead of $H_2S$ gas to reduce the anode liquor discharged from the electrolytic cell A. The calcines produced by roasting the ore are put into the dissolving tank B and leached with the reduced anode liquor from the reducing tower L. The solution is then filtered, and a small part of it sent to the limestone tank D and electrolytic cell A, where it is treated as before, and part of it is sent back to the reducing tower L. The reason for dividing the solution and sending the larger part of it back to the reducing tower, has been explained in connection with procedure shown in Figs. 6 and 7. Also the optional step of passing the solution through scrap iron at F before it goes to the limestone tank, has already been described.

It will be understood that in each instance agitation of some sort should be provided for in solution tank B.

With any of the foregoing methods dense, clean, smooth and pure deposits of iron may be made by electrolysis from a ferrous solution, and the raw material from which the iron is obtained may be scrap iron, oxidized ores, sulphide ores or combinations of them.

We claim:

1. The art of making electrolytic iron from a solution containing ferrous and ferric iron, which comprises neutralizing the solution with calcium carbonate, and depositing iron from the solution by electrolysis.

2. The art of making electrolytic iron from a solution containing ferrous and ferric iron, which comprises neutralizing the solution with calcium carbonate, maintaining the solution at a temperature in the region of the boiling point and depositing iron from the solution while hot by electrolysis.

3. The art of making electrolytic iron from a solution containing ferrous and ferric iron, which comprises neutralizing the solution, subjecting the solution to electrolysis in an electrolytic cell to deposit iron at the cathode, and preventing ferric iron in solution from acting on the cathode deposit.

4. The art of making electrolytic iron from a solution containing ferrous and ferric iron, which comprises neutralizing the solution, subjecting the solution to electrolysis in an electrolytic cell to deposit iron at the cathode, and maintaining the flow of the electrolyte away from the cathode.

5. The art of making electrolytic iron from a solution containing ferrous and ferric iron, which comprises neutralizing the solution, subjecting the solution to electrolysis in an electrolytic cell to deposit iron at the cathode, and depolarizing the cathode by means of precipitated ferric salts.

6. The art of making electrolytic iron from a solution containing ferrous and ferric iron, which comprises neutralizing the solution and at the same time precipitating ferric salts, and subjecting the solution containing precipitated ferric salts to electrolysis in an electrolytic cell, whereby iron will be deposited at the cathode and the cathode will be depolarized by the precipitated ferric salts.

7. The art of making electrolytic iron from a solution containing ferrous and ferric iron, which comprises neutralizing the solution, maintaining the solution at a temperature in the region of the boiling point, subjecting the solution while hot to electrolysis in an electrolytic cell to deposit iron at the cathode, preventing ferric iron in solution from acting on the cathode deposit, and depolarizing the cathode by means of precipitated ferric salts.

8. The art of making electrolytic iron from a solution containing ferrous and ferric iron, which comprises neutralizing the solution and at the same time precipitating ferric salts, maintaining the solution at a temperature in the region of the boiling point subjecting the solution containing precipitated ferric salts, while hot, to electrolysis in an electrolytic cell whereby iron will be deposited at the cathode and the cathode will be depolarized by the precipitated ferric salts, and maintaining the flow of the electrolyte away from the cathode.

9. The art of making electrolytic iron from a solution containing iron which comprises subjecting the solution to electrolysis in an electrolytic cell to deposit iron on the cathode, and physically rubbing the deposit to remove hyrogen gas therefrom.

10. The art of making electrolytic deposits of metal which comprises depositing metal by electrolysis from a solution upon a cathode having a surface of relatively more fusible material than the deposit, and melting said fusible surface to loosen the metal deposit therefrom.

11. The art of making electrolytic iron which comprises depositing iron by electrolysis from a solution containing iron upon a cathode having a surface of fusible material adapted to conduct electric current, and melting the fusible surface of the cathode to loosen the iron deposit therefrom.

12. The art of making electrolytic iron in an electrolytic cell having a cathode in the form of a mandrel, which comprises coating the mandrel with a fusible material adapted to conduct electric current, depositing iron from a solution by electrolysis upon said coated mandrel, melting the fusible coating, and withdrawing the mandrel from the iron deposit.

13. The art of making electrolytic iron which comprises chemically reducing a solution containing ferric iron by treating it with iron sulphide, and depositing iron from the reduced solution by electrolysis.

14. The art of making electrolytic iron which comprises treating sulphide ore of iron with a solution containing ferric iron, thereby both reducing the solution and dissolving iron from the sulphide ore, and then depositing iron from the solution by electrolysis.

15. The art of making electrolytic iron which comprises treating sulphide ore of iron with a solution containing ferric iron, thereby both reducing the solution and dissolving iron from the sulphide ore, and at the same time precipitating sulphur as a by-product, and then depositing iron from the solution by electrolysis.

16. The art of making electrolytic iron which comprises chemically reducing a solution containing ferric iron by treating it with iron sulphide, then neutralizing the solution, and depositing iron from the reduced solution by electrolysis.

17. The art of making electrolytic iron which comprises treating sulphide ore of iron with a solution containing ferric iron, thereby both reducing the solution and dissolving iron from the sulphide ore, then neutralizing the solution, and depositing iron from the solution by electrolysis.

18. The art of making electrolytic iron which comprises chemically reducing a solution containing ferric iron by treating it with iron sulphide, then maintaining the solution at a temperature in the region of the boiling point and depositing iron from the solution while hot by electrolysis.

19. The art of making electrolytic iron which comprises treating sulphide ore of iron with a solution containing ferric iron, thereby both reducing the solution and dissolving iron from the sulphide ore, then maintaining the solution at a temperature in the region of the boiling point and depositing iron from the solution while hot by electrolysis.

20. The art of making electrolytic iron which comprises chemically reducing a solution containing ferric iron by treating it with iron sulphide, neutralizing the solution, maintaining the solution at a temperature in the region of the boiling point and depositing iron from the solution while hot by electrolysis.

21. The art of making electrolytic iron which comprises treating sulphide ore of iron with a solution containing ferric iron, thereby both reducing the solution and dissolving iron from the sulphide ore, neutralizing the solution, maintaining the solution at a temperature in the region of the boiling point and depositing iron from the solution while hot by electrolysis.

22. The art of making electrolytic iron which comprises chemically reducing a solution containing ferric iron by treating it with iron sulphide, subjecting the solution to electrolysis in an electrolytic cell to deposit iron at the cathode, and preventing ferric iron in solution from acting on the cathode deposit.

23. The art of making electrolytic iron which comprises treating sulphide ore of iron with a solution containing ferric iron, thereby both reducing the solution and dissolving iron from the sulphide ore, subjecting the solution to electrolysis in an electrolytic cell to deposit iron at the cathode, and preventing ferric iron in solution from acting on the cathode deposit.

24. The art of making electrolytic iron which comprises chemically reducing a solution containing ferric iron by treating it with iron sulphide, subjecting the solution to electrolysis in an electrolytic cell to deposit iron at the cathode, and maintaining the flow of the electrolyte away from the cathode to prevent ferric iron in solution from acting on the cathode deposit.

25. The art of making electrolytic iron which comprises treating sulphide ore of iron with a solution containing ferric iron, thereby both reducing the solution and dissolving iron from the sulphide ore, subjecting the solution to electrolysis in an electrolytic cell to deposit iron at the cathode, and maintaining the flow of the electrolyte away from the cathode to prevent ferric iron in solution from acting on the cathode deposit.

26. The art of making electrolytic iron which comprises chemically reducing a solution containing ferric iron by treating it with iron sulphide, subjecting the solution to electrolysis in an electrolytic cell to deposit iron at the cathode, and depolarizing the cathode by means of precipitated ferric salts.

27. The art of making electrolytic iron which comprises chemically reducing a solution containing ferric iron by treating it with iron sulphide, neutralizing the solution and at the same time precipitating ferric salts with calcium carbonate and subjecting the solution containing precipitated ferric salts to electrolysis in an electrolytic cell, whereby iron will be deposited at the cathode, and the cathode will be depolarized by the precipitated ferric salts.

28. The art of making electrolytic iron which comprises chemically reducing a solution containing ferric iron by treating it with iron sulphide, neutralizing the solution, maintaining the solution at a temperature in the region of the boiling point subjecting the solution while hot to electrolysis in an electrolytic cell to deposit iron at the cathode, preventing ferric iron in solution from acting on the cathode deposit, and depolarizing the cathode by means of precipitated ferric salts.

29. The art of making electrolytic iron which comprises chemically reducing a solution containing ferric iron by treating it with iron sulphide, neutralizing the solution and at the same time precipitating ferric salts with calcium carbonate heating the solution to a high temperature, subjecting the solution containing precipitated ferric salts, while hot, to electrolysis in an electrolytic cell whereby iron will be deposited at the cathode and the cathode will be depolarized by the precipitated ferric salts, and maintaining the flow of the electrolyte away from the cathode to prevent ferric iron in solution from acting on the cathode deposit.

30. The art of making electrolytic iron from a ferric solution, which comprises roasting sulphide ore to oxidize the same and generate sulphur dioxide gas, introducing the sulphur dioxide gas into the ferric solution to reduce the same to ferrous state, leaching the roasted ore with said reduced solution, and depositing iron from the leach liquor by electrolysis.

31. The art of making electrolytic iron from a solution containing ferrous and ferric iron which comprises subjecting the solution to electrolysis in an electrolytic cell to deposit iron at the cathode, and preventing ferric iron in solution from acting on the cathode deposit.

32. The art of making electrolytic iron from a solution containing ferrous and ferric iron, which comprises subjecting the solution to electrolysis in an electrolytic cell to deposit iron at the cathode, and maintaining the flow of the electrolyte away from the cathode.

33. The art of making electrolytic iron from a solution containing ferrous and ferric iron, which comprises subjecting the solution to electrolysis in an electrolytic cell to deposit iron at the cathode while maintaining the solution at a temperature in the region of the boiling point, and preventing ferric iron in solution from acting on the cathode deposit.

Signed by us at Cambridge, Massachusetts, this 26th day of November, 1920.

FREDERIC A. EUSTIS.
CARLE R. HAYWARD.
HENRY M. SCHLEICHER.
DONALD BELCHER.